US012598252B2

(12) United States Patent
Watson et al.

(10) Patent No.: US 12,598,252 B2
(45) Date of Patent: *Apr. 7, 2026

(54) INTERACTIVE CALLING METHODS AND SYSTEMS

(71) Applicant: ENVESTED, INC., Brooklyn, NY (US)

(72) Inventors: Isa Watson, Brooklyn, NY (US); Daniel Watson, New York, NY (US)

(73) Assignee: ENVESTED, INC., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,532

(22) Filed: Jun. 19, 2024

(65) Prior Publication Data

US 2024/0340372 A1 Oct. 10, 2024

Related U.S. Application Data

(63) Continuation of application No. 17/658,654, filed on Apr. 10, 2022, now Pat. No. 12,047,531.

(51) Int. Cl.
*H04M 3/42* (2006.01)
(52) U.S. Cl.
CPC .............................. *H04M 3/42042* (2013.01)
(58) Field of Classification Search
CPC ................................................ H04M 3/42042
USPC ....................................... 379/201.01, 265.01
See application file for complete search history.

(56) References Cited

U.S. PATENT DOCUMENTS

| | | | |
|---|---|---|---|
| 8,416,767 B2 | 4/2013 | Wang et al. | |
| 8,797,999 B2 | 8/2014 | Pance et al. | |
| 8,880,124 B2 | 11/2014 | Ferringo | |
| 8,892,670 B2 | 11/2014 | Chakravarthy et al. | |
| 9,674,694 B2 | 6/2017 | Subbaramoo et al. | |
| 9,888,011 B2 | 2/2018 | Carames | |
| 10,021,146 B2 | 7/2018 | Lee et al. | |
| 10,469,427 B2 | 11/2019 | Aronoff et al. | |
| 10,775,982 B2 | 9/2020 | Katai et al. | |
| 10,775,996 B2 | 9/2020 | Brody et al. | |
| 11,734,526 B2 * | 8/2023 | Wagner .................. | B65G 47/82 235/470 |
| 2012/0220347 A1 | 8/2012 | Davidson | |
| 2013/0143534 A1 | 6/2013 | Ferringo | |
| 2016/0014059 A1 | 1/2016 | Chunilal | |
| 2020/0201818 A1 | 6/2020 | Khajuria | |
| 2022/0343250 A1 | 10/2022 | Tremblay | |

* cited by examiner

*Primary Examiner* — William J Deane, Jr.
(74) *Attorney, Agent, or Firm* — Mertzlufft Law PLLC; Joshua Mertzlufft

(57) ABSTRACT

Interactive calling may enable users to share call previews and reactions associated with calls, and generate call summaries. Methods and systems for interactive calling may include receiving a callee identifier from a caller device, determining a callee device associated with the callee identifier, and transmitting a call preview received from the caller device to the callee device simultaneously with an attempt to initiate a call between the caller device and the callee device.

26 Claims, 13 Drawing Sheets

Computing Platform(s) 302

Electronic Storage 304

Processor(s) 306

Machine-Readable Instructions 308

Callee Group Retrieval Module 314

Request Receipt Module 316

Callee Device Determination Module 318

Call Initiation Module 320

Call Metadata Sending Module 322

Reaction Receiving Module 324

Reaction Logging Module 326

Call Summary Sending Module 328

Remote Platform(s) 310

External Resources 312

300

400

Receive call initiation request — 402

Determine callee device — 404

Instruct call interface to initiate call — 406

Send call metadata to callee device — 408

Receive reaction — 410

Log reaction — 412

Send call summary — 414

500

502 Retrieve callee identifier group

504 Receive callee identifier selected from callee identifier group

600

602 Receive additional callee identifier

604 Determine additional callee device

606 Connect call to additionlal callee device

1200

INTERACTIVE CALLING METHODS AND SYSTEMS

CROSS REFERENCE TO RELATED APPLICATIONS

This application is a continuation of U.S. application Ser. No. 17/658,654, filed on Apr. 10, 2022, the entire disclosure of which is hereby incorporated by reference.

BACKGROUND

Mobile communications form part of modern social interaction between people. While some mobile communications implement asynchronous messaging, many people maintain a preference of being able to speak to each other in a live audio call. With the advent of social media, people increasingly provide reactions, such as emojis, etc., for purposes of communication or entertainment in response to content created by others. However, conventional means of audio communication, for example, live audio calls, do not present means of doing the same.

Therefore, improved communication methods and systems are needed.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

A method may comprise receiving, at a processor, a call initiation request from a caller device. The method may further include determining, using the processor, a callee device. The method may further include instructing, using the processor, a call interface to initiate a call. The method may further include sending, using the processor, call metadata to the callee device. The method may further include receiving, at the processor, from the caller device or the callee device, a reaction. The method may further include logging, using the processor, the reaction. The method may further include sending, using the processor, the call summary.

A system may include a processor and an electronic storage device. The electronic storage device may be in electronic communication with the processor. The electronic storage device may have a database stored thereon. The processor may be configured to receive a call initiation request from a caller device. The processor may be further configured to determine a callee device. The processor may be further configured to instruct a call interface to initiate a call. The processor may be further configured to send call metadata to the callee device. The processor may be further configured to receive from the caller device or the callee device, a reaction. The processor may be further configured to log the reaction. The processor may be further configured to send the call summary.

A tangible, non-transient, computer-readable media may have instructions thereupon which when implemented by a processor cause the processor to perform a method. The method may comprise receiving a call initiation request from a caller device. The method may further include determining a callee device. The method may further include instructing a call interface to initiate a call. The method may further include sending call metadata to the callee device.

The method may further include receiving from the caller device or the callee device, a reaction. The method may further include logging the reaction. The method may further include sending the call summary.

The caller device may be associated with a user. The caller device or user may be identified by a caller identifier. The call initiation request may include the caller identifier, a callee identifier, and a call preview. The call preview may be inputted on the caller device.

The determining may be performed using a database. The database may be stored on an electronic storage device. The electronic storage device may be in electronic communication with the processor.

The callee device may be associated with the callee identifier.

The call interface may be configured to connect the call to the caller device. The call interface may be configured to connect the call to the callee device.

The call metadata may include the call preview.

The reaction may be received while the call is in progress.

The reaction may be logged in a call summary.

The call summary may include the logged reaction. The call summary may be sent to at least one of the caller device, the callee device, or an external resource.

The reaction may include an emoji, a static reaction, or an animated reaction.

The reaction may be selected on the callee device or the caller device from a group of reactions displayed on the callee device or the caller device while the call is in progress.

The call summary may be sent to an external social media resource.

The callee identifier may be selected by the user of the caller device from a group of callee identifiers associated with the caller identifier.

The callee identifier may be selected by the user of the caller device by dragging a profile image associated with the callee identifier to a callee identifier landing zone.

The call metadata may compose a push notification. Sending the call metadata to the callee device may include sending the push notification to the callee device.

The call interface may be configured to implement voice-over-internet protocol.

The call interface may be implemented using an external resource in electronic communication with the processor. The call interface may be implemented using the processor.

The call initiation request may further include an additional callee identifier. The processor may be further configured to determine an additional callee device. The additional callee device may be associated with an additional callee identifier. The determination may be using the database. The call interface may be further configured to connect the call to the additional callee device.

The callee identifier may be selected by the user of the caller device by dragging a profile image associated with the callee identifier to a callee identifier landing zone.

The callee identifier may be selected by the user of the caller device from a group of callee identifiers associated with the caller identifier.

Each callee identifier of the group of callee identifiers may be associated with a user profile which has opted-in to receiving communications from the user.

The processor may be further configured to retrieve the group of callee identifiers from the database based on the caller identifier. The processor may be further configured to send the group of callee identifiers to the caller device.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1:
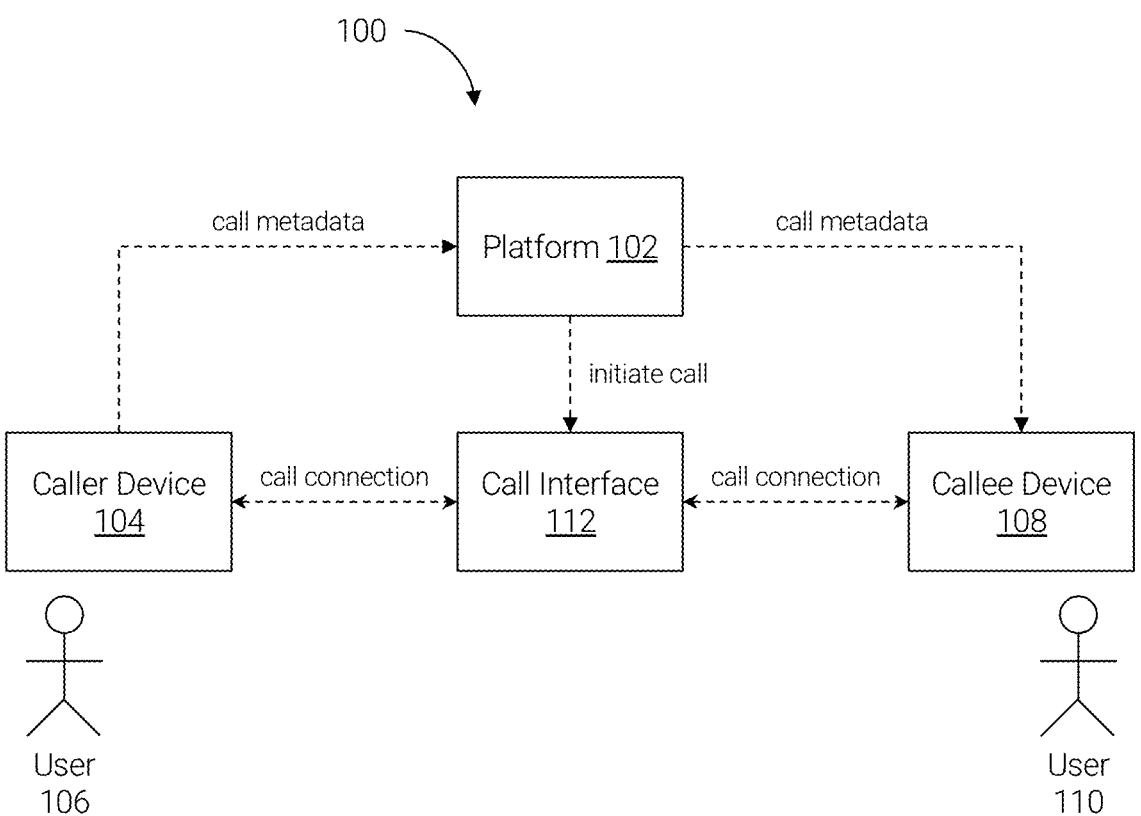
FIG. 1 illustrates an information flow diagram of a system, according to one or more implementations herein.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Implementations disclosed herein interactive calling methods and systems. Interactive calling may include receiving a call initiation request from a caller device associated with a user, which may be identified by a caller identifier. The callee identifier may include a call preview, which may be inputted on the caller device. A callee device associated with the callee identifier may be determined. A call interface may be instructed to initiate a call and may be configured to connect the call to the caller device and the callee device. Call metadata may be sent to the callee device, and the call metadata may include the call preview. Reactions may be received from the caller device or the callee device while the call is in progress, which may be logged in a call summary. The call summary may be sent to at least one of the caller device, the callee device, or an external platform.

FIG. 1 illustrates an information flow diagram of a system 100, according to one or more implementations herein. The information flow diagram may depict a flow of information between various actors in a system for interactive calling. The information flow diagram depicts a possible flow of information according to an embodiment and may depict only a portion of the information flow in the embodiment, and thus should not be interpreted as comprehensive of the embodiment or all embodiments.

The information flow diagram of FIG. 1 may illustrate example relationships between, for example, a caller device 104, a platform 102, a callee device 108, a call interface 112, and various connections and interfaces therebetween in system 100. Caller device 104 may be used by, for example, user 106. Callee device 108 may be used, for example, by user 110. User 106 may have preregistered caller device 104 to operate within system 100. User 110 may have preregistered callee device 108 to operate within system 100. Such preregistration may include, for example, registering (e.g., signing up) for an account associated with platform 102. Platform 102 may authenticate caller device 104 and/or callee device 108.

In the example presented by system 100, user 106 may desire to place a call using system 100 to user 110. To do so, user 106 may use caller device 104 to indicate an intent to initiate a call with callee device 108. Such call initialization may include a request sent to platform 102 to initiate a call. Accompanying this request may be call metadata, which may be sent from caller device 104 to platform 102. Such call metadata may include, for example, a call preview. When an indication is made by user 106 on the caller device 104 to start a call, caller device 104 may prompt user 106 to enter a call preview. The call preview may be entered, for example, in a text field, which may be presented to the user 106 on caller device 104 using a variety of methods. The call preview may include, for example, various information which user 106 may desire to communicate to user 110 prior to the connection of a call between caller device 104 and callee device 108. Such information may include, for example, a subject of the call, a question, a statement, a topic, a summary, or any other information which user 106 may desire to communicate to user 110 prior to the connection of a call therebetween.

Platform 102 may receive the call metadata from caller device 104, and may process the same prior to relaying to callee device 108. In an operation, platform 102 may deliver the call metadata to callee device 108. Such delivered call metadata may include all or some of the call metadata received by platform 102 from caller device 104. For example, platform 102 may be configured to shorten or compress or encrypt call metadata when it is transferred from platform 102 to callee device or when it is transferred from caller device 104 to platform 102.

In a further operation, which may be executed synchronously with the sending of the call metadata from platform 102 to callee device 108 or asynchronously with the same (e.g., simultaneously), platform 102 may instruct call interface 112 to initiate a call.

Call interface 112 may be implemented external to platform 102 (e.g., on a third-party system), or call interface 112 may be implemented as part of platform 102 (e.g., on the same processor). Call interface 112 may implement a variety of protocols to construct a call, for example, voice-over-internet protocol (VOIP). Call interface 112 may be configured to establish a call and to connect either or both of caller device 104 and callee device 108 to the call. The call connection between caller device 104 and call interface 112 may be established upon receipt of the request to initiate a call at platform 102 from caller device 104, or after any necessary processing by platform 102. The call connection between call interface 112 and callee device 108 may be established upon acceptance on callee device 108 of the call. Such acceptance on callee device 108 may be, for example, by user 110 after viewing the call metadata (e.g., the call preview) on callee device 108. If user 110 decides to accept the call, call interface 112 may connect callee device 108 to the call, for example, by bridging a call (e.g., over VoIP) between caller device 104 and callee device 108.

During the call, additional call metadata may be exchanged between caller device 104, platform 102, and callee device 108. Such additional call metadata may include, for example, call reaction information. In some embodiments, caller device 104 and/or callee device 108 may present to user 106 and/or user 110, respectively, a displayed interface with which the respective users may select reactions while the call is in progress. Such reactions may include a variety of static, dynamic, or animated reactions, for example, emojis. An emoji may include a digital image, animated image (e.g., ANIMOJI®), moving object, symbol, icon, number, text (e.g., name, acronym, etc.), or any other ideogram that represents an intent, a meaning, an idea, an emotion, or the like. An emoji may include a two-dimensional or a three-dimensional representation. While described in the context of "emojis," techniques described herein can be applicable to any type of renderable content item. When a user 106 or 110 selects a reaction while the call is in progress, an instruction in the form of additional metadata may be sent from such user's device to platform 102 including the reaction. The reaction may be logged by platform 102 and sent to the other of the caller device 104 or the callee device 108. The reaction sent to the device may be displayed on the device of the other user. In this way, a user may send reactions to the other user while the call is in progress. In some embodiments these reactions may be logged by platform 102 in a call summary. The call summary may be available to caller device 104 and callee device 108. Either of such devices may be used by their respective users to, for example, share the call summary with each other, via social media (e.g., via an interface or application programming interface (API) connected to an external resource hosting a social media web application), or as otherwise available for sharing using the respective device.

Such reactions may be determined, for example, on a per user basis. For example, a user may have a different set of reactions accessible during a call for different users the user may call. Such reactions may be predetermined by the user's choice, default reactions, the user's most-used reactions, or otherwise determined based on learning which reactions a user uses most often with the user which the user is calling.

Figure 2:
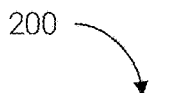
FIG. 2 illustrates a data flow diagram depicting example events (e.g., exchanges of data) between a platform, a caller, a callee, and a call interface, according to one or more implementations herein.
Figure 2:
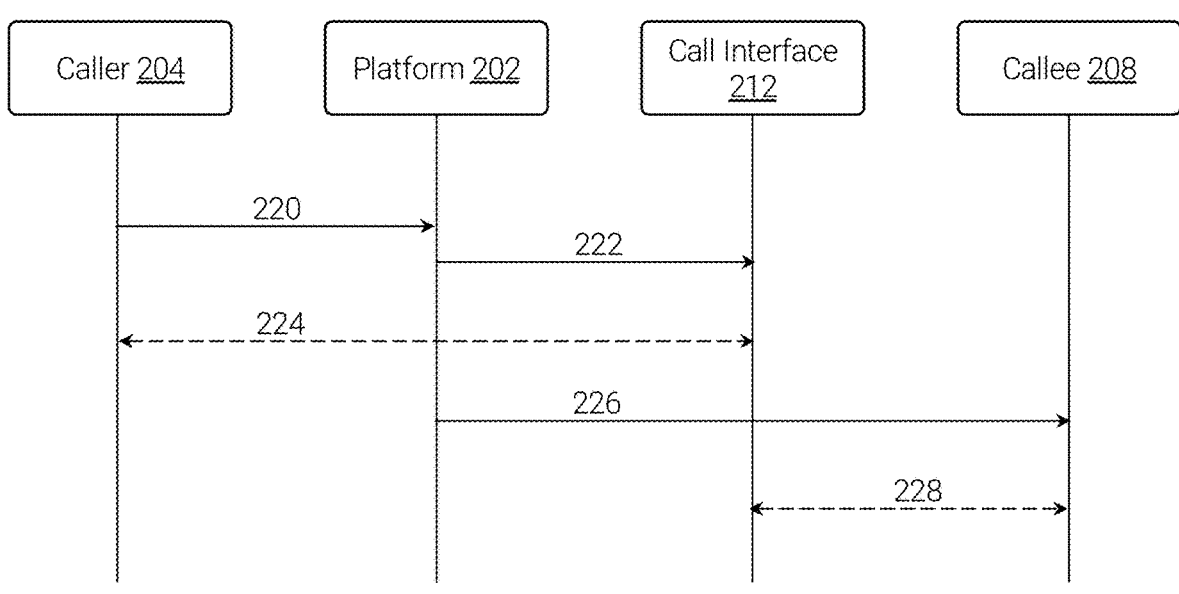

FIG. 2 illustrates a data flow diagram 200 depicting example events (e.g., exchanges of data) between a platform 202, a caller 204, a callee 208, and a call interface 212, according to one or more implementations herein. A data flow diagram represents a sequence of events (e.g., exchanges of data) that takes place among a set of actors over time. Time begins at the top of the diagram and advances toward the bottom. Data flow diagram 200 depicts a possible sequence of events according to an embodiment and may depict only a portion of events composing the embodiment, and thus should not be interpreted as comprehensive of the embodiment or all embodiments. Events (e.g., requests, responses, and other transmissions of data) may be illustrated as between the actors depicted. The actors may communicate with each other, for example, via the internet or via another protocol as discussed herein. Unless expressly limited herein, events may be synchronous or asynchronous regardless of the particular depiction, organization, or line styles illustrated in data flow diagram 200.

Accordingly, it will be understood that the particular sequence of events shown in data flow diagram 200 is not a limitation on the present disclosure. For example, various embodiments may be incorporated into different data flows without departing from the present disclosure.

Caller 204 and callee 208 may use the system represented in data flow diagram 200 to establish and conduct communications. Caller 204 and callee 208 may interact with platform 202 and call interface 212. When desiring to place a call, caller 204 may send a request 220 to platform 202 to initiate a call. Request 220 may include various metadata regarding the intended call, including, inter alia, a call preview entered at the device of caller 204. Platform 202 may then send a request 222 to call interface 212 to initiate a call. Platform 202 may then send a request 226 to callee 208 to notify callee 208 of the incoming call and provide callee 208 an opportunity to accept or reject the call. Synchronous or asynchronous to request 226, call interface 212 may establish a call connection handshake, and may then further establish a call 224, with caller 204. If callee 208 accepts the call, call interface 212 may establish a call connection handshake, and may further establish a call 228, with callee 208. In this way, caller 204 and callee 208 may be able to communicate with each other via call interface 212.

Figure 3:
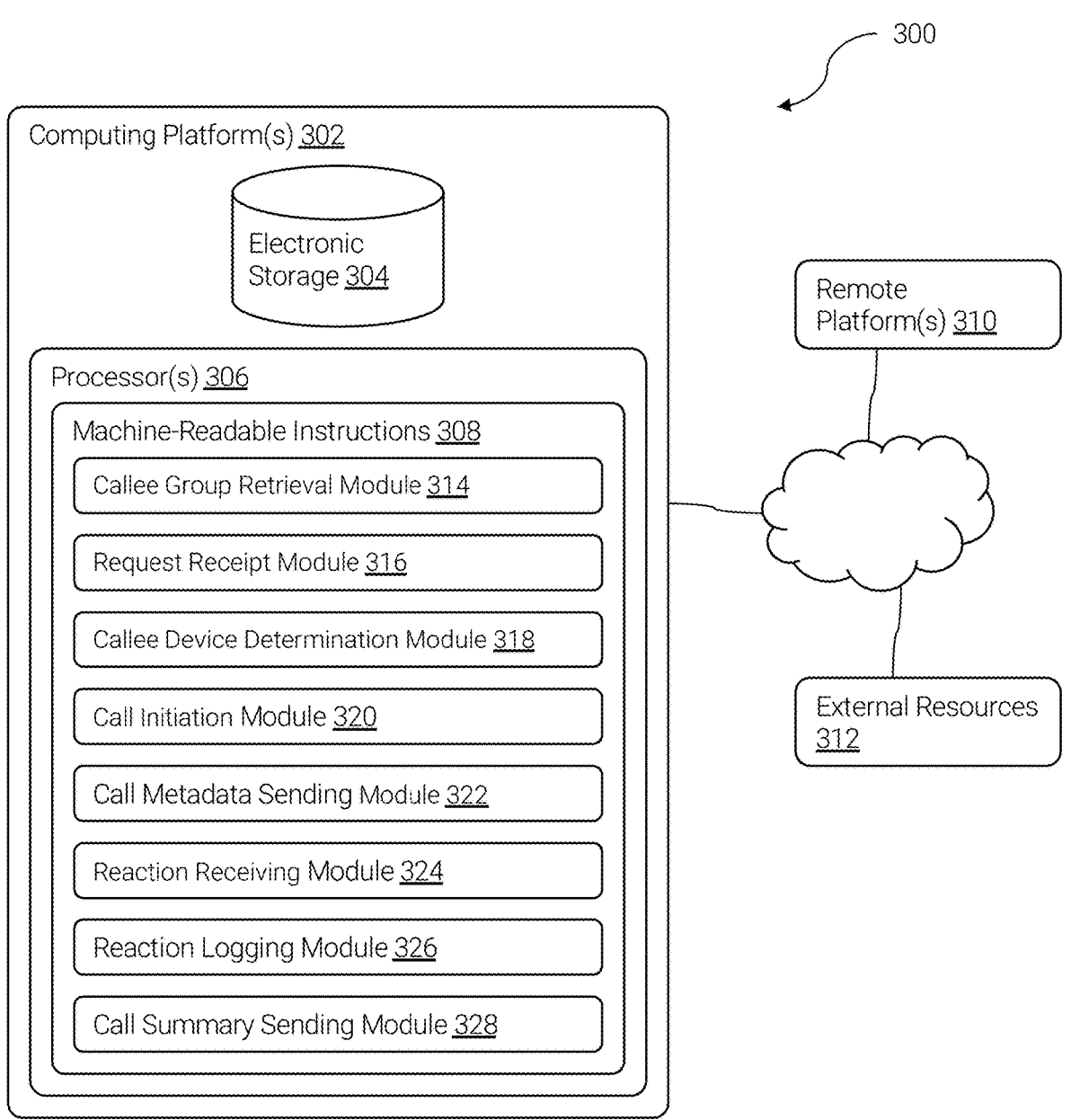
FIG. 3 illustrates a system for interactive calling, according to one or more implementations herein.

FIG. 3 illustrates a system 300 for interactive calling, according to one or more implementations herein. In some embodiments, system 300 may include one or more computing platforms 302. Computing platform(s) 302 may be configured to communicate with one or more remote platforms 310 according to a client/server architecture, a peer-to-peer architecture, and/or other architectures. Remote platform(s) 310 may be configured to communicate with other remote platforms via computing platform(s) 302 and/or according to a client/server architecture, a peer-to-peer architecture, and/or other architectures. Users may access system 300 via remote platform(s) 310.

In some embodiments, computing platform(s) 302, remote platform(s) 310, and/or external resources 312 may be operatively linked via one or more electronic communication links. For example, such electronic communication links may be established, at least in part, via a network such as the internet and/or other networks using, for example, TCP/IP or cellular hardware enabling wired or wireless (e.g., cellular, 2G, 3G, 4G, 4G LTE, 5G, or WIFI) communication. It will be appreciated that this is not intended to be limiting, and that the scope of this disclosure includes embodiments in which computing platform(s) 302, remote platform(s) 310, and/or external resources 312 may be operatively linked via some other communication media.

The internet may include an interconnected network of systems and a suite of protocols for the end-to-end transfer of data therebetween. A model describing may be the Transport Control Protocol and Internet Protocol (TCP/IP), which may also be referred to as the internet protocol suite. TCP/IP provides a model of four layers of abstraction: an application layer, a transport layer, an internet layer, and a link layer. The link layer may include hosts accessible without traversing a router, and thus may be determined by the configuration of the network (e.g., a hardware network implementation, a local area network, a virtual private network, or a networking tunnel). The link layer may be used to move packets of data between the internet layer interfaces of different hosts on the same link. The link layer may interface with hardware for end-to-end transmission of data. The internet layer may include the exchange of datagrams across network boundaries (e.g., from a source network to a destination network), which may be referred to as routing, and is performed using host addressing and identification over an internet protocol (IP) addressing system (e.g., IPv4, IPv6). A datagram may include a self-contained, independent, basic unit of data, including a header (e.g., including a source address, a destination address, and a type) and a payload (e.g., the data to be transported), to be transferred across a packet-switched network. The transport layer may utilize the user datagram protocol (UDP) to provide for basic data channels (e.g., via network ports) usable by applications for data exchange by establishing end-to-end, host-to-host connectivity independent of any underlying network or structure of user data. The application layer may include various user and support protocols used by applications users may use to create and exchange data, utilize services, or provide services over network connections established by the lower layers, including, for example, routing protocols, the hypertext transfer protocol (HTTP), the file transfer protocol (FTP), the simple mail transfer protocol (SMTP), and the dynamic host configuration protocol (DHCP). Such data creation and exchange in the application layer may utilize, for example, a client-server model or a peer-to-peer networking model. Data from the application layer may be encapsulated into UDP datagrams or TCP streams for interfacing with the transport layer, which may then effectuate data transfer via the lower layers.

A given remote platform 310 may include one or more processors configured to execute computer program modules. The computer program modules may be configured to enable an expert or user associated with the given remote platform 310 to interface with system 300 and/or external resources 312, and/or provide other functionality attributed herein to remote platform(s) 310. By way of non-limiting example, a given remote platform 310 and/or a given computing platform 302 may include one or more of a server, a desktop computer, a laptop computer, a handheld computer, a tablet computing platform, a Netbook, a Smartphone, a gaming console, and/or other computing platforms.

External resources 312 may include sources of information outside of system 300, external entities participating with system 300, and/or other resources. In some embodiments, some or all of the functionality attributed herein to external resources 312 may be provided by resources included in system 300.

Computing platform(s) 302 may include electronic storage 304, one or more processors 306, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 304 may comprise non-transitory storage media that electronically stores information and may have a database stored thereon in accordance with various embodiments. The electronic storage media of electronic storage 304 may include one or both of system storage that is provided integrally (i.e., substantially non-removable) with computing platform(s) 302 and/or removable storage that is removably connectable to computing platform(s) 302 via, for example, a port (e.g., a USB port, an I7 1394 port, a THUNDERBOLT™ port, etc.) or a drive (e.g., disk drive, flash drive, or solid-state drive etc.). Electronic storage 304 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 304 may include one or more virtual storage resources (e.g., cloud storage, a virtual private network, and/or other virtual storage resources). Electronic storage 304 may store software algorithms, information determined by processor(s) 306, information received from computing platform(s) 302, information received from remote platform(s) 310, and/or other information that enables computing platform(s) 302 to function as described herein.

Processor(s) 306 may be configured to provide information processing capabilities in computing platform(s) 302. As such, processor(s) 306 may include one or more of a digital processor, an analog processor, a digital circuit designed to process information, an analog circuit designed to process information, a state machine, and/or other mechanisms for electronically processing information. Although processor(s) 306 is shown in FIG. 3 as a single entity, this is for illustrative purposes only. In some embodiments, processor(s) 306 may include a plurality of processing units. These processing units may be physically located within the same device, or processor(s) 306 may represent processing functionality of a plurality of devices operating in coordination. Processor(s) 306 may be configured to execute one or more of the modules disclosed herein, and/or other modules. Processor(s) 306 may be configured to execute one or more of the modules disclosed herein, and/or other modules by software; hardware; firmware; some combination of software, hardware, and/or firmware; and/or other mechanisms for configuring processing capabilities on processor(s) 306. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, model-view-controller (MVC) principles, application programming interfaces (APIs), system-specific programming languages and principles, cross-platform programming languages and principles, pre-compiled programming languages, "byte-code" programming languages, object-oriented programming principles or languages, other programming principles or languages, JavaBeans, Microsoft Foundation Classes (MFC), Streaming SIMD Extension (SSE), or other technologies or methodologies, as desired.

It should be appreciated that although the modules disclosed herein are illustrated in FIG. 3 as being implemented within a single processing unit, in embodiments in which processor(s) 306 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor(s) 306 may be configured to execute one or more additional modules that may perform some or all of the functionality attributed herein to one of modules disclosed herein.

Computing platform(s) 302 may be configured by machine-readable instructions 308. Machine-readable instructions 308 may include one or more instruction modules. The instruction modules may include computer program modules. The instruction modules may include one or more of the modules disclosed herein and/or other instruction modules.

A callee group retrieval module 314 may be configured to retrieve from a database on electronic storage 304, callee identifiers associated with a caller device. Thus, when initiating a call, the callee identifier may be selected by the user of the caller device from a group of callee identifiers associated with the caller identifier. The callee identifier may be selected by the user of the caller device by dragging a profile image associated with the callee identifier to a callee identifier landing zone. The callee identifier may be selected by the user of the caller device from a group of callee identifiers associated with the caller identifier. Each callee identifier of the group of callee identifiers may be associated with a user profile which has opted-in to receiving communications from the user.

A request receipt module 316 may be configured to receive a call initiation request from a caller device. The caller device may be associated with a user. The caller device or user may be identified by a caller identifier. The call initiation request may include the caller identifier, a callee identifier, and a call preview. The call preview may be inputted on the caller device.

The call initiation request may further include an additional callee identifier. The processor may be further configured to determine an additional callee device. The additional callee device may be associated with an additional callee identifier. The determination may be using the database. The call interface may be further configured to connect the call to the additional callee device.

A callee device determination module 318 may be configured to determine a callee device. The determining may be performed using the database stored on electronic storage 304. The callee device may be associated with the callee identifier. The call interface may be implemented using an external resource in electronic communication with the processor. The call interface may be implemented using the processor.

A call initiation module 320 may be configured to instruct a call interface to initiate a call. The call interface may be configured to connect the call to the caller device and the callee device. The call interface may be configured to implement voice-over-internet protocol.

A call metadata sending module 322 may be configured to send call metadata to the callee device. The call metadata may include the call preview. The call metadata may compose a push notification. Sending the call metadata to the callee device may include sending the push notification to the callee device.

A reaction receiving module 324 may be configured to receive from the caller device or the callee device, a reaction. The reaction may be received while the call is in progress.

A reaction logging module 326 may be configured to log the reaction. The reaction may be logged in a call summary. The call summary may include the logged reaction. The reaction may include an emoji, a static reaction, or an animated reaction. The reaction may be selected on the callee device or the caller device from a group of reactions displayed on the callee device or the caller device while the call is in progress.

A call summary sending module 328 may be configured to send the call summary. The call summary may be sent to at least one of the caller device, the callee device, or an external resource. The call summary may be sent to an external social media resource.

Various steps, functions, and/or operations of computing platform(s) 302, remote platform(s) 310, and/or external resources 312 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor 306 (or computing platform 302) or, alternatively, multiple processors 306 (or multiple computing platforms 302). Moreover, different sub-systems of system 300 may include one or more computing or logic systems. Therefore, the description herein should not be interpreted as a limitation on the present disclosure but merely an illustration.

Figure 4:
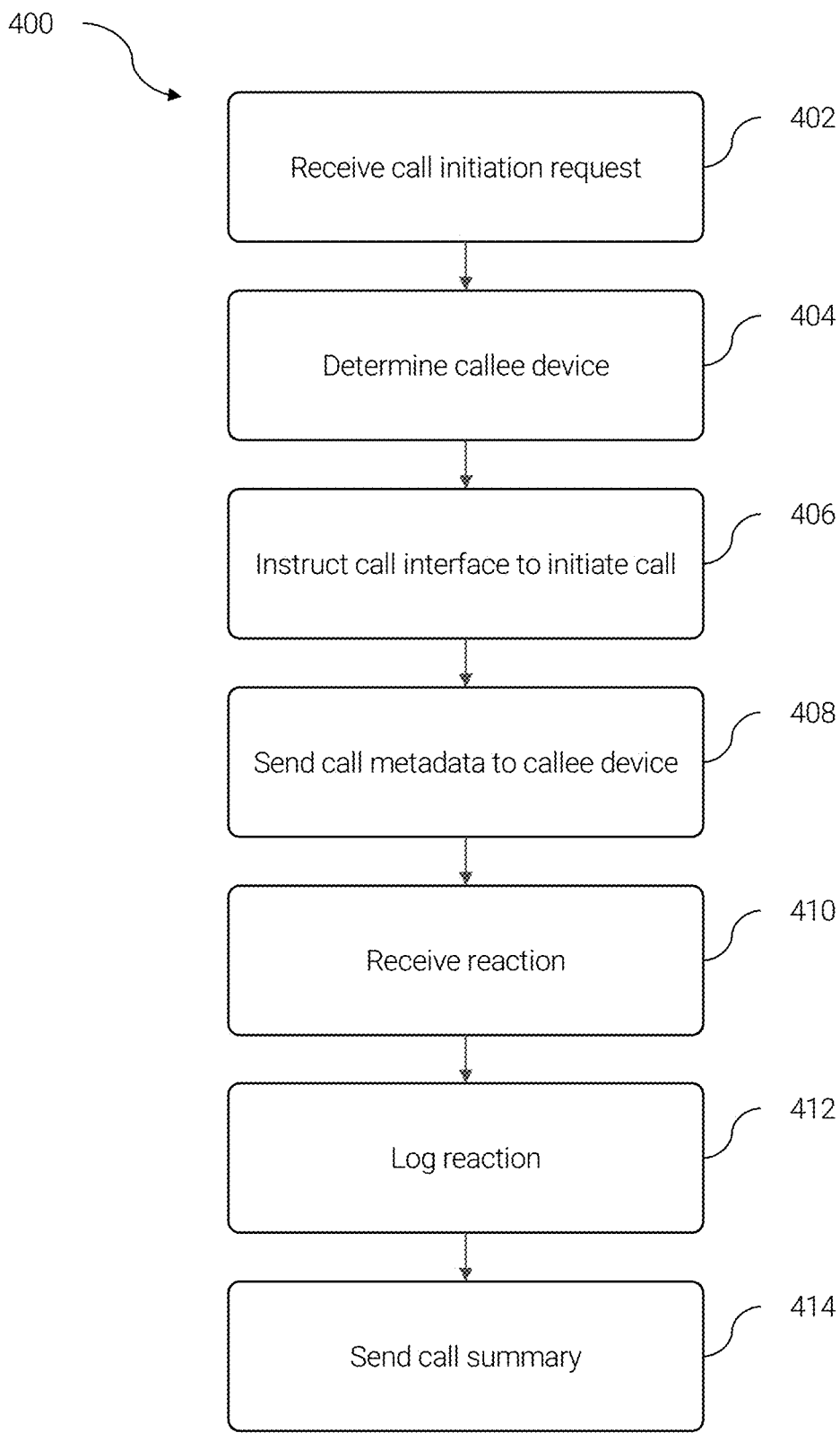
FIG. 4 illustrates a method for interactive calling, according to one or more implementations herein.

FIG. 4 illustrates a method 400 for interactive calling, according to one or more implementations herein. The operations of method 400 presented herein are intended to be illustrative. In some embodiments, method 400 may be accomplished with one or more additional operations not described, and/or without one or more of the operations discussed. Additionally, the order in which the operations of method 400 are illustrated in FIG. 4 and described herein is not intended to be limiting.

An operation 402 may include receiving, at a processor, a call initiation request from a caller device. The caller device may be associated with a user. The caller device or user may be identified by a caller identifier. The call initiation request may include the caller identifier, a callee identifier, and a call preview. The call preview may be inputted on the caller device. The callee identifier may be selected by the user of the caller device from a group of callee identifiers associated with the caller identifier. Each callee identifier of the group of callee identifiers may be associated with a user profile which has opted-in to receiving communications from the user. The processor may be further configured to retrieve the group of callee identifiers from the database based on the caller identifier. The processor may be further configured to send the group of callee identifiers to the caller device. The callee identifier may be selected by the user of the caller device by dragging a profile image associated with the callee identifier to a callee identifier landing zone. Operation 402 may be performed by one or more hardware processors configured by machine-readable instructions including a module in accordance with one or more embodiments.

An operation 404 may include determining, using the processor, a callee device. The determination in operation 404 may be performed using a database. The database may be stored on an electronic storage device. The electronic storage device may be in electronic communication with the processor. The callee device may be associated with the callee identifier. Operation 404 may be performed by one or more hardware processors configured by machine-readable instructions including a module in accordance with one or more embodiments.

An operation 406 may include instructing, using the processor, a call interface to initiate a call. The call interface may be configured to connect the call to the caller device. The call interface may be configured to connect the call to the callee device. The call interface may be configured to implement voice-over-internet protocol. The call interface may be implemented using an external resource in electronic communication with the processor. The call interface may be implemented using the processor. Operation 406 may be performed by one or more hardware processors configured by machine-readable instructions including a module in accordance with one or more embodiments.

An operation 408 may include sending, using the processor, call metadata to the callee device. The call metadata may include the call preview. The call metadata may compose a push notification. Sending the call metadata to the callee device may include sending the push notification to the callee device. Operation 408 may be performed by one or more hardware processors configured by machine-readable instructions including a module in accordance with one or more embodiments.

An operation 410 may include receiving, at the processor, from the caller device or the callee device, a reaction. The reaction may be received while the call is in progress. The reaction may be logged in a call summary. The reaction may include an emoji, a static reaction, or an animated reaction. The reaction may be selected on the callee device or the caller device from a group of reactions displayed on the callee device or the caller device while the call is in progress. Operation 410 may be performed by one or more hardware processors configured by machine-readable instructions including a module in accordance with one or more embodiments.

An operation 412 may include logging, using the processor, the reaction. Operation 412 may be performed by one or more hardware processors configured by machine-readable instructions including a module in accordance with one or more embodiments.

An operation 414 may include sending, using the processor, the call summary. The call summary may include the logged reaction. The call summary may be sent to at least one of the caller device, the callee device, or an external resource. The call summary may be sent to an external social media resource. Operation 414 may be performed by one or more hardware processors configured by machine-readable instructions including a module in accordance with one or more embodiments.

Figures 5, 6:
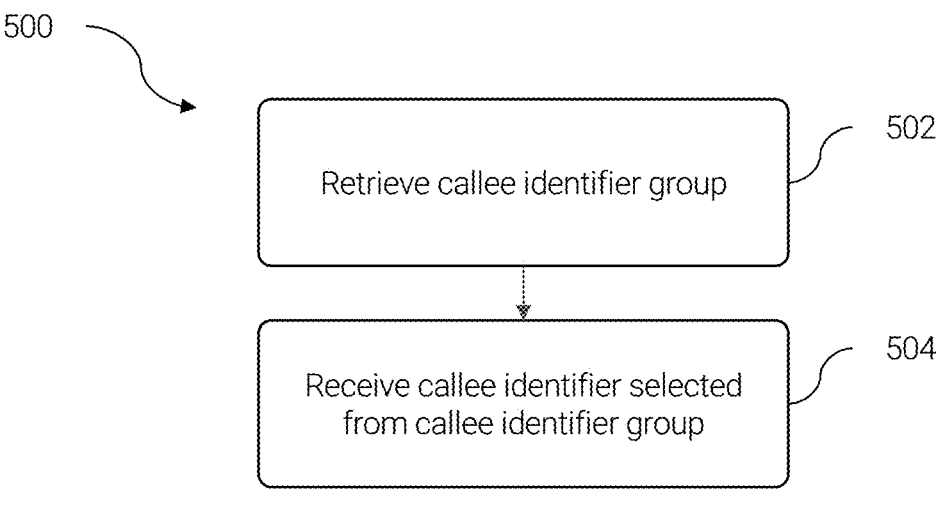
FIG. 5 illustrates a method for interactive calling, according to one or more implementations herein.
FIG. 6 illustrates a method for adding an additional callee, according to one or more implementations herein.

FIG. 5 illustrates a method for interactive calling, according to one or more implementations herein. The operations of method 500 presented herein are intended to be illustrative. In some embodiments, method 500 may be accomplished with one or more additional operations not described, and/or without one or more of the operations discussed. Additionally, the order in which the operations of method 500 are illustrated in FIG. 5 and described herein is not intended to be limiting.

An operation 502 may include retrieving a callee identifier group (e.g., from the database based on the caller identifier). Each callee identifier of the group of callee identifiers may be associated with a user profile which has opted-in to receiving communications from the user. The callee identifier may be selected by the user of the caller device by dragging a profile image associated with the callee identifier to a callee identifier landing zone. Operation 502 may be performed by one or more hardware processors configured by machine-readable instructions including a module in accordance with one or more embodiments.

An operation 504 may include receiving a callee identifier selected by a user from the callee identifier group. The callee identifier may be selected by the user of the caller device from the group of callee identifiers associated with the caller identifier. Operation 504 may be performed by one or more hardware processors configured by machine-readable instructions including a module in accordance with one or more embodiments.

FIG. 6 illustrates a method for adding an additional callee, according to one or more implementations herein. The operations of method 600 presented herein are intended to be illustrative. In some embodiments, method 600 may be accomplished with one or more additional operations not described, and/or without one or more of the operations discussed. Additionally, the order in which the operations of method 600 are illustrated in FIG. 6 and described herein is not intended to be limiting.

An operation 602 may include retrieving an additional callee identifier. The call initiation request may further include an additional callee identifier. Operation 602 may be performed by one or more hardware processors configured by machine-readable instructions including a module in accordance with one or more embodiments.

An operation 604 may include determining an additional callee device. The additional callee device may be associated with an additional callee identifier. The determination may be using the database. Operation 604 may be performed by one or more hardware processors configured by machine-readable instructions including a module in accordance with one or more embodiments.

An operation 606 may include connecting the call to the additional callee device using the call interface. Operation 606 may be performed by one or more hardware processors configured by machine-readable instructions including a module in accordance with one or more embodiments.

In some embodiments, any number of the methods disclosed herein may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods disclosed herein in response to instructions stored electronically on an electronic storage medium. The one or more processing devices may include one or more devices configured through hardware, firmware, and/or software to be specifically designed for execution of one or more of the operations of methods disclosed herein.

Figure 7:
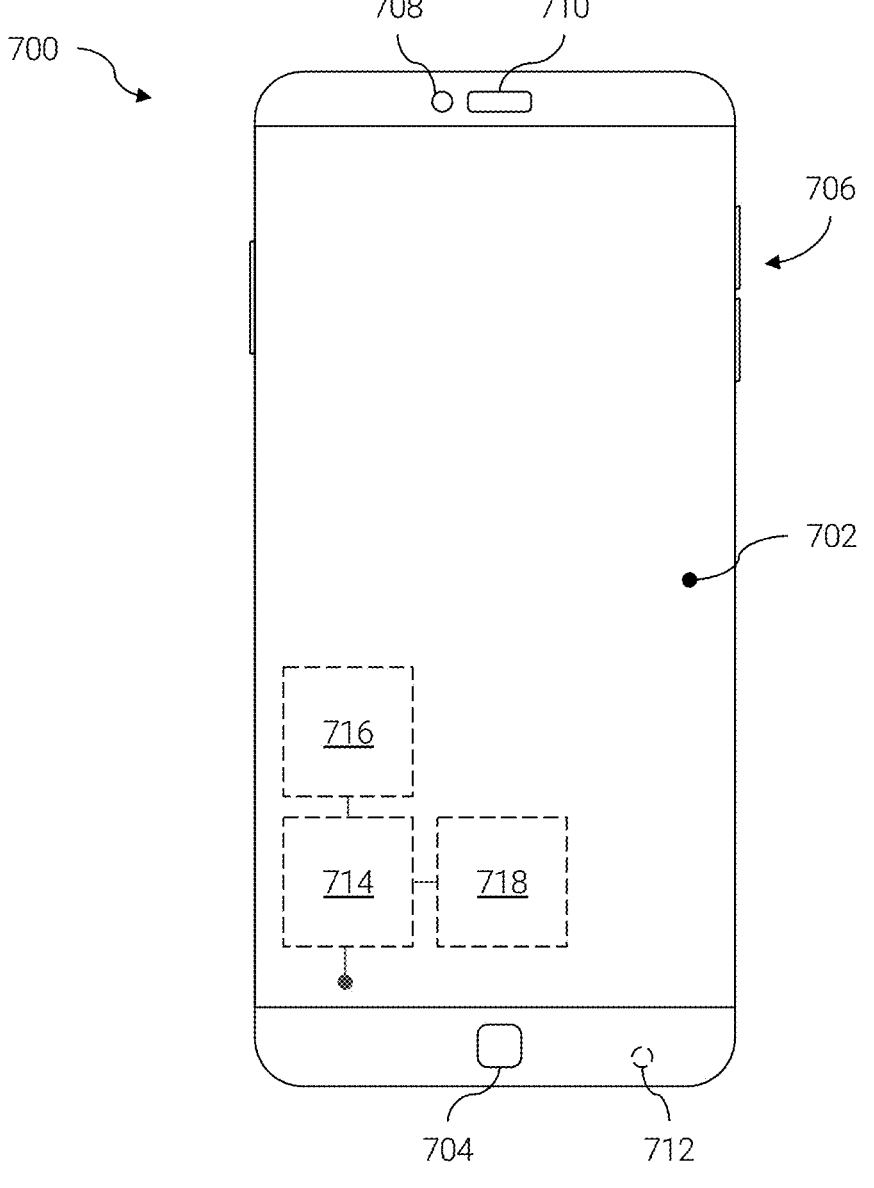
FIG. 7 illustrates a device for interfacing with a system for interactive calling, according to one or more implementations herein.

FIG. 7 illustrates a device 700 for interfacing with a system for interactive calling, according to one or more implementations herein. The system for interactive calling, which device 700 interfaces with, may be similar to, for example system 300. Device 700 may be similar to, for example, remote platform 310 or external resource 312. While in FIG. 7, device 700 is depicted as a smartphone, it will be understood that device 700 may include various devices, such as, for example, one or more of a server, a desktop computer, a laptop computer, a handheld computer, a tablet computing platform, a Netbook, a Smartphone, a gaming console, and/or other computing platforms.

Device 700 may be configured to communicate with other devices or remote platforms via a computing platform, which may be similar to computing platform(s) 302, and/or according to a client/server architecture, a peer-to-peer architecture, and/or other architectures. Users may access the system for interactive calling, which may be similar to system 300 via device 700.

Device 700 may include various components, all or some of which may be used in operation or use of Device 700. Such components may include, inter alia, a display 702, a face button 704, side button 706, a camera 708, a speaker 710, a microphone 712, a processor 714, an electronic storage 716, and a network interface 718. It will be understood that not all of these components are required for every embodiment of device 700, and there may be more than one of any given component in various embodiments of device 700.

Device 700 may include one or more processors configured to execute computer program modules. The computer program modules may be configured to enable an expert or user associated with device 700 to interface with a system for interactive calling, (e.g., similar to system 300) and/or external resources (e.g., similar to external resource 312), and/or provide other functionality attributed herein to device 700.

Device 700 may include electronic storage 716, one or more processor(s) 714, and/or other components. Device 700 may include communication lines, or ports to enable the exchange of information with a network and/or other computing platforms (e.g., network interface 718). Illustration of device 700 in FIG. 7 is not intended to be limiting. Device 700 may include a plurality of hardware, software, and/or firmware components operating together to provide the functionality attributed herein to device 700. For example, device 700 may be implemented by a cloud of computing platforms operating together as device 700.

Electronic storage 716 may be directly or indirectly in operative electronic communication with processor 714 may comprise non-transitory storage media that electronically stores information. The electronic storage media of electronic storage 716 may include one or both of system storage that is provided integrally (i.e., substantially non-removable) with device 700 and/or removable storage that is removably connectable to device 700 via, for example, a port (e.g., a USB port, an I7 1394 port, a THUNDERBOLT™ port, etc.) or a drive (e.g., a disk drive, flash drive, or solid-state drive etc.). Electronic storage 716 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 716 may include one or more virtual storage resources (e.g., cloud storage, a virtual private network, and/or other virtual storage resources). Electronic storage 716 may store software algorithms, information determined by processor(s) 714, information received from device 700, information received from the system or another remote platform, and/or other information that enables device 700 to function as described herein.

Processor(s) 714 may be configured to provide information processing capabilities in device 700. As such, processor(s) 714 may include one or more of a digital processor, an analog processor, a digital circuit designed to process information, an analog circuit designed to process information, a state machine, and/or other mechanisms for electronically processing information. Although processor(s) 714 is shown in FIG. 7 as a single entity, this is for illustrative purposes only. In some embodiments, processor(s) 714 may include a plurality of processing units. These processing units may be physically located within the same device, or processor(s) 714 may represent processing functionality of a plurality of devices operating in coordination. Processor(s) 714 may be configured to execute one or more of the modules disclosed herein, and/or other modules. Processor(s) 714 may be configured to execute one or more of the modules disclosed herein, and/or other modules by software; hardware; firmware; some combination of software, hardware, and/or firmware; and/or other mechanisms for configuring processing capabilities on processor(s) 714. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, model-view-controller (MVC) principles, application programming interfaces (APIs), system-specific programming languages and principles, cross-platform programming languages and principles, pre-compiled programming languages, "bytecode" programming languages, object-oriented programming principles or languages, other programming principles or languages, Java-Beans, Microsoft Foundation Classes (MFC), Streaming SIMD Extension (SSE), or other technologies or methodologies, as desired.

It should be appreciated that although the modules disclosed herein are illustrated in FIG. 7 as being implemented within a single processing unit, in embodiments in which processor(s) 714 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor(s) 714 may be configured to execute one or more additional modules that may perform some or all of the functionality attributed herein to one of modules disclosed herein.

Device 700 may be configured by machine-readable instructions. Such machine-readable instructions may include one or more instruction modules. The instruction modules may include computer program modules, which may be similar to, for example, a portion of machine-readable instructions 308. The instruction modules may include one or more of the modules disclosed herein and/or other instruction modules.

A network interface 718 may be directly or indirectly in operative electronic communication with, inter alia, processor 714. Network interface 718 may operatively link processor 714 and/or device 700 with one or more other computing platform(s), remote platform(s), and/or external resources via one or more electronic communication links. For example, such electronic communication links may be established, at least in part, via a network such as the internet and/or other networks using, for example, TCP/IP or cellular hardware enabling wired or wireless (e.g., cellular, 2G, 3G, 4G, 4G LTE, 5G, or WIFI) communication. It will be appreciated that this is not intended to be limiting, and that the scope of this disclosure includes embodiments in which device 700, one or more other computing platform(s), remote platform(s), and/or external resources may be operatively linked via some other communication media.

Processor 714 may be directly or indirectly in operative electronic communication with display 702. Display 702 may include a device (or "hardware component") that displays "display data" to form an image or images, such as, but not limited to, a picture, text, a desktop background, a gaming background, a video, an application window etc. One example of display 702 may include an integrated display as found in electronic devices such as handheld computing devices, electronic book readers, mobile telephones (smartphones), personal-digital-assistants (PDAs), wearable devices (smart-watches, smart-glasses, etc.). Display 702 may employ any appropriate display technology, such as for example, LCD flat panel, LED flat panel, flexible panels, etc., and may include other display hardware that may, as needed for a particular electronic device, be operatively coupled to other devices and components. Therefore, display 702 may include display hardware such as, but not limited to, a frame buffer, hardware display drivers, etc. that store and refresh display data to be displayed by display 702. Also, display 702 may include integrated hardware for implementation of touchscreen functionality such that the display is operative to receive user input by touch or via a stylus.

The term "image" as used herein may refer generally to what is "displayed" on a display (e.g., display 702) and which may be stored in memory as "display data." That is, an image may be displayed on a display by sending the appropriate display data to the display. Examples of images may include, but are not limited to, a background or "wallpaper," a gaming background, a video, an application window, an icon, a widget, etc. In other words, the term "image" may refer to a background, or may refer individually, or collectively, to elements or objects in the foreground, of hovering over, a background image such as wallpaper. The term "display data" may be used interchangeably herein with the term "image data" and refers to the information (e.g., data, or digital information) that the display interprets and/or decodes to show (i.e., to display) the user an image, as well as any associated elements or objects in the foreground of the background or wallpaper, etc.

Processor 714 may be directly or indirectly in operative electronic communication with face button 704 and/or side buttons 706. Face button 704 and/or side buttons 706 may be configured to perform a variety of functions in relation to device 700.

Processor 714 may be directly or indirectly in operative electronic communication with camera 708. Camera 708 may include a single camera, multiple cameras, or a camera array. Camera 708 may operate by electronically capturing reflected light from objects and assigning quantitative values to one or more aspects of the reflected light, such as pixels. Camera 708 may include one or more sensors having one or more filters associated therewith. The sensors of camera 708 may capture information regarding any number of pixels of the reflected light corresponding to one or more base colors (e.g., red, green, or blue) expressed in the reflected light, and store values associated with the pixel colors as image data and/or transmit image data to another device for further analysis or reproduction. The camera may also be configured to determine depth information, such as the distance between the camera and an object in the field of view of the camera. Depth information may be included in the image data generated by the camera.

Processor 714 may be directly or indirectly in operative electronic communication with speaker 710. Speaker 710 may include a single speaker, multiple speakers, or a speaker array. Processor 714 may be directly or indirectly in operative electronic communication with microphone 712. Microphone 712 may include a single microphone, multiple microphones, or a microphone array.

Figure 8A:
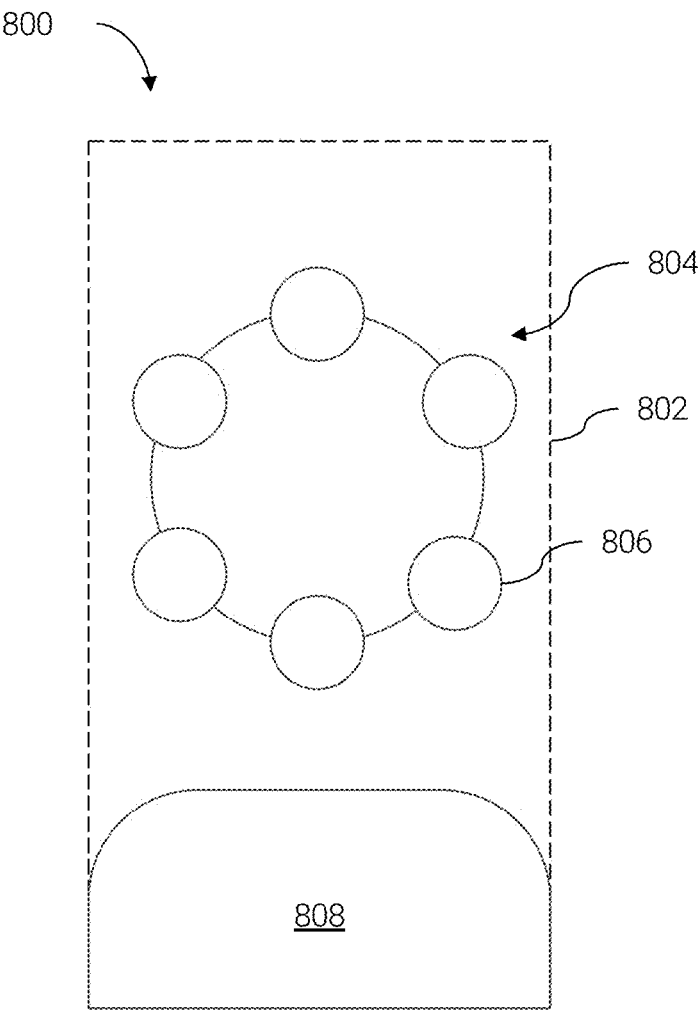
FIG. 8A illustrates a display presenting an example display interface presenting a callee group, according to one or more implementations herein.

FIG. 8A illustrates a display 800 presenting an example display interface 802 presenting a callee group, according to one or more implementations herein. Display interface 802 may be displayed on a display similar to, for example display 702 Accordingly, it will be understood that the particular presentation or arrangement shown in on display 800 is not a limitation on the present disclosure. For example, various embodiments may be incorporated into different displays without departing from the present disclosure.

Display interface 802 may present visual elements to a user, including, for example, a squad 804 (i.e., a callee group associated with respective callees), which may include, for example a squad member 806 (i.e., a callee associated with a callee identifier). Further, a callee identifier landing zone 808 may be displayed within display interface 802.

Figure 8B:
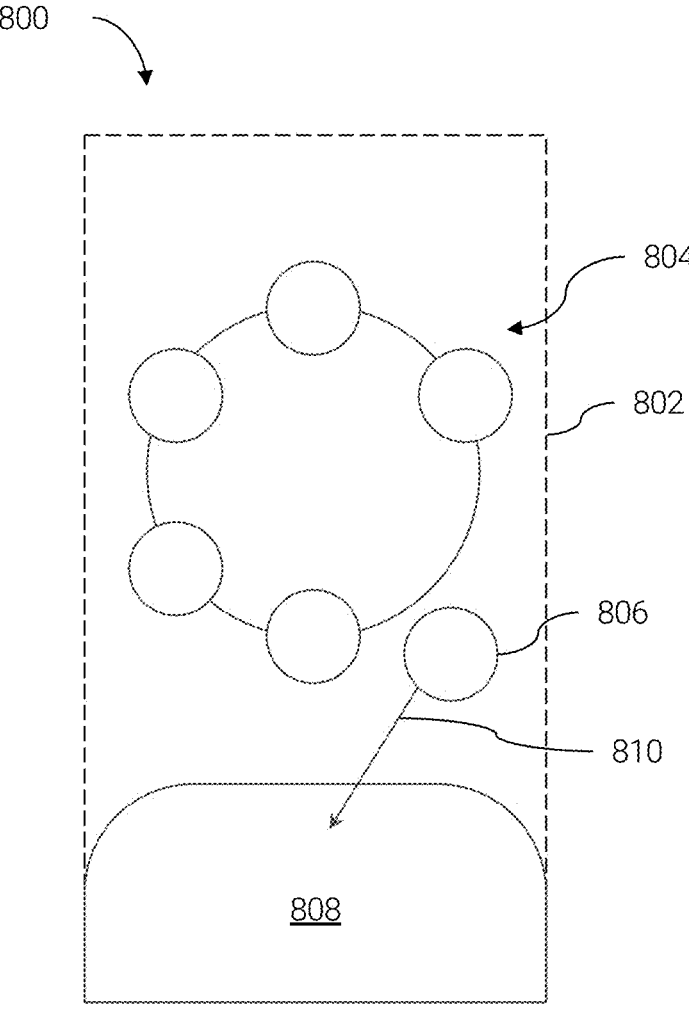
FIG. 8B illustrates a display presenting an example display interface presenting a callee group and with a callee of the callee group being selected to initiate a call, according to one or more implementations herein.

FIG. 8B illustrates a display 800 presenting an example display interface 802 presenting a callee group and with a callee of the callee group being selected to initiate a call, according to one or more implementations herein. Display interface 802 may be displayed on a display similar to, for example display 702 Accordingly, it will be understood that the particular presentation or arrangement shown in on display 800 is not a limitation on the present disclosure. For example, various embodiments may be incorporated into different displays without departing from the present disclosure.

In FIG. 8B, a user of display interface 802 may be selecting squad member 806 to initiate a call therewith. Squad members may be selected in a variety of manners, and thus the manner in which squad member 806 is selected in display interface 802 is not intended to be limiting. For example, squad member 806 is selected in FIG. 8B by dragging in direction 810 squad member 806 to callee identifier landing zone 808. When squad member 806 is dropped in callee identifier landing zone 808, the user device may begin the process of creating the call initiation request.

Figure 9:
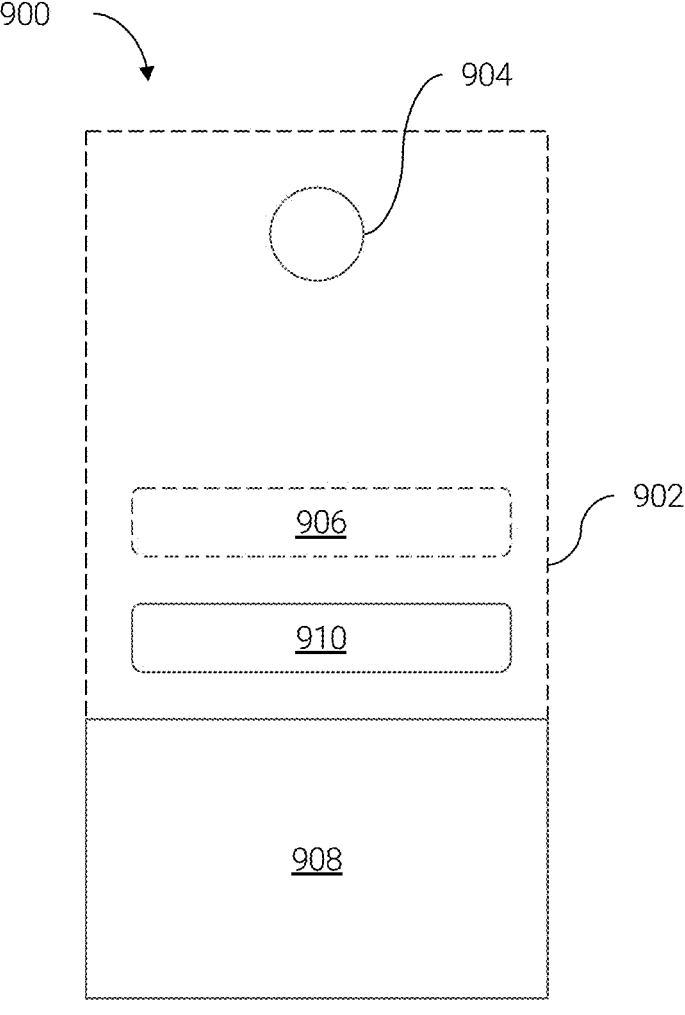
FIG. 9 illustrates a display presenting an example display interface presenting a call preview input interface, according to one or more implementations herein.

FIG. 9 illustrates a display 900 presenting an example display interface 902 presenting a call preview input interface, according to one or more implementations herein. Display interface 902 may be displayed on a display similar to, for example display 702 Accordingly, it will be understood that the particular presentation or arrangement shown in on display 900 is not a limitation on the present disclosure. For example, various embodiments may be incorporated into different displays without departing from the present disclosure.

Display interface 902 may present a call setup interface, as may be viewed by a user of a user device creating a call initiation request. In this example, display interface 902 may present a user identifier, for example, a profile picture, username, real name, etc. at 904. An input area 906 may be usable by the user to enter a call preview, for example, text. Such call preview text may be entered using keyboard 908. It will be understood that keyboard 908 may be a virtual keyboard or a physical keyboard and need not be displayed in display interface 902. Once satisfied with the input at 906, a user may select call button 910 to initiate the call request with the platform.

Figure 10:
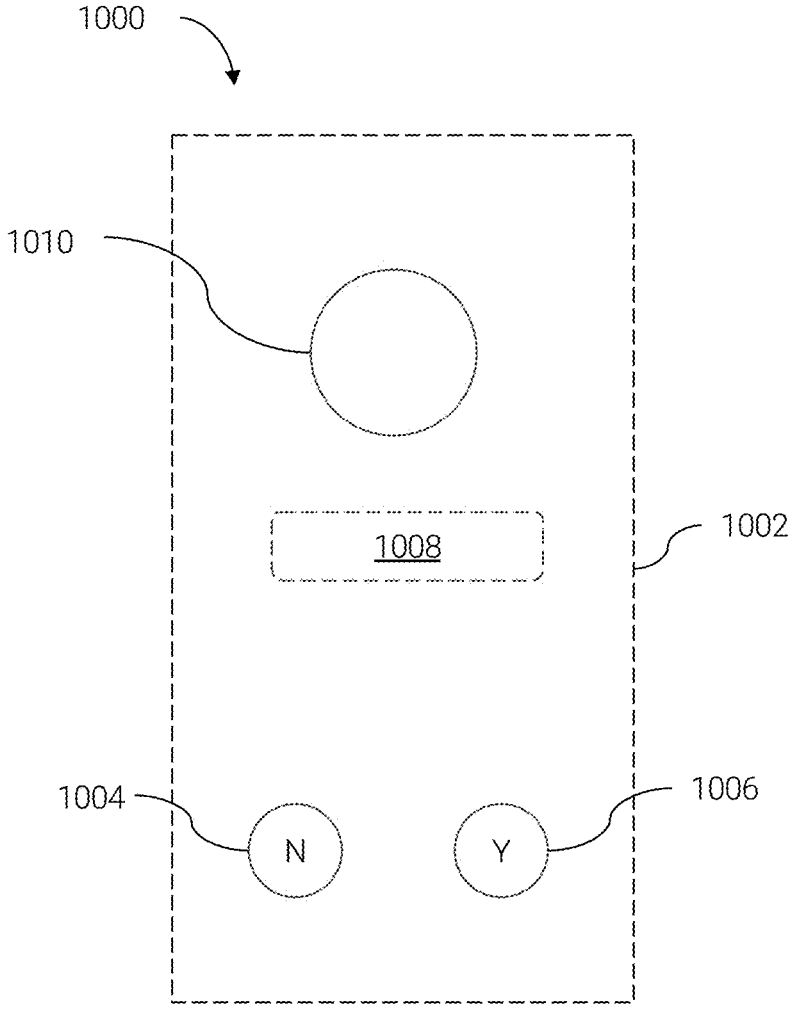
FIG. 10 illustrates a display presenting an example display interface presenting an incoming call notification including a call preview, according to one or more implementations herein.

FIG. 10 illustrates a display 1000 presenting an example display interface 1002 presenting an incoming call notification including a call preview, according to one or more implementations herein. Display interface 1002 may be displayed on a display similar to, for example display 702 Accordingly, it will be understood that the particular presentation or arrangement shown in on display 1000 is not a limitation on the present disclosure. For example, various embodiments may be incorporated into different displays without departing from the present disclosure.

Display interface 1002 may be presented to a callee user when receiving a call from a caller user. The display interface 1002 may include various visual elements attendant to presenting an incoming call, notification to the callee user, including, for example, a caller profile picture 1010, a call decline button 1004, a call accept button 1006, and the call preview 1008. In this way, the callee user may be able to view not only who is calling, but also may view the call preview 1008, which may be the same as or similar to the call preview entered by the caller user in input area 906.

Figure 11A:
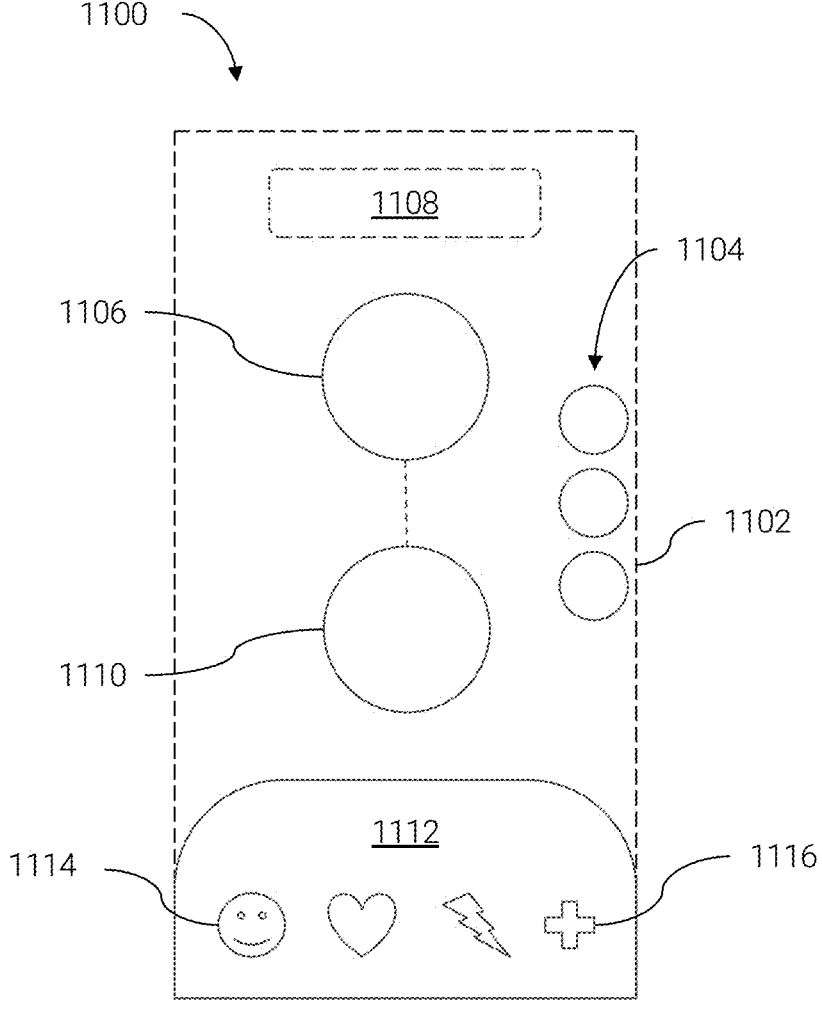
FIG. 11A illustrates a display presenting an example display interface presenting in-call displays and controls, according to one or more implementations herein.

FIG. 11A illustrates a display 1100 presenting an example display interface 1102 presenting in-call displays and controls, according to one or more implementations herein. Display interface 1102 may be displayed on a display similar to, for example display 702 Accordingly, it will be understood that the particular presentation or arrangement shown in on display 1100 is not a limitation on the present disclosure. For example, various embodiments may be incorporated into different displays without departing from the present disclosure.

Display interface 1102 may be presented to one or both of the callee user and the caller user while a call is in progress. Display interface 1102 may include various visual elements attendant to conducting a call in progress, including, for example, call control buttons 1104 (e.g., mute, end call, add callee, etc.), a profile picture of the callee 1106, a call preview 1108, and a profile picture of the caller 1110. Display interface 1102 may further include a reaction tray area 1112, which may include a variety of reactions presented to the user for selection during the call. For example, a series of reactions may be displayed, including reaction 1114, among others, and an option 1116 to select further options not already displayed in reaction tray area 1112.

Figure 11B:
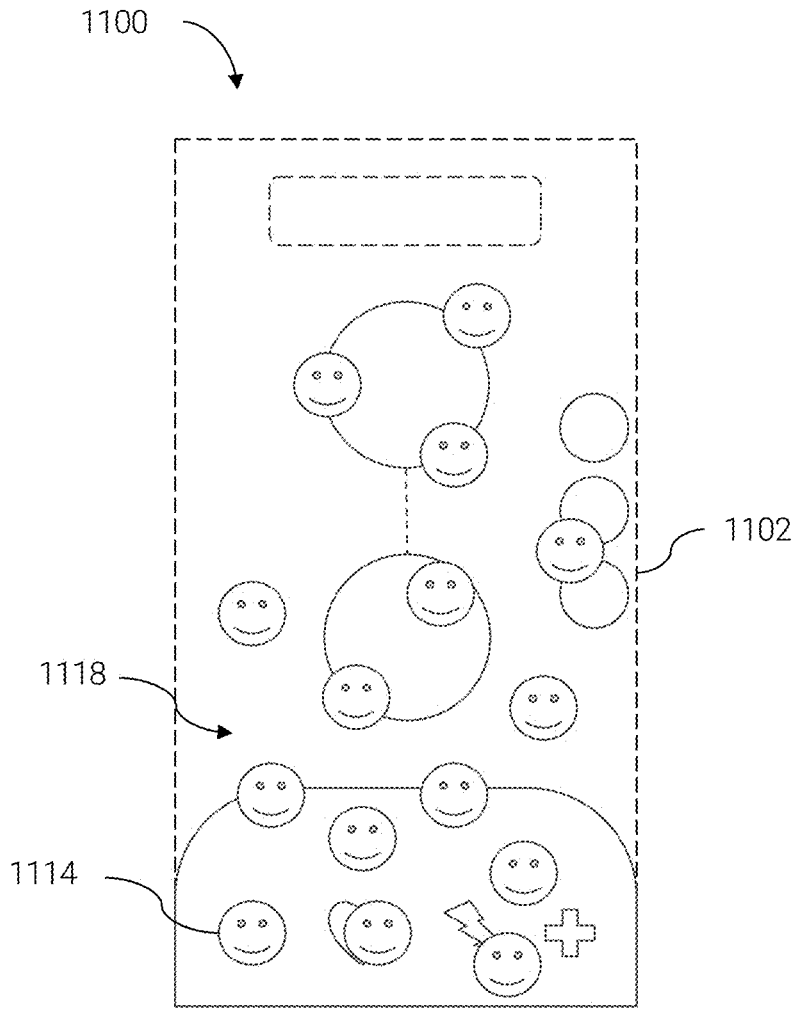
FIG. 11B illustrates a display presenting an example display interface presenting in-call displays and controls and showing a reaction, according to one or more implementations herein.

FIG. 11B illustrates a display 1100 presenting an example display interface 1102 presenting in-call displays and controls and showing a reaction, according to one or more implementations herein. Display interface 1102 may be displayed on a display similar to, for example display 702 Accordingly, it will be understood that the particular presentation or arrangement shown in on display 1100 is not a limitation on the present disclosure. For example, various embodiments may be incorporated into different displays without departing from the present disclosure.

FIG. 11B presents display interface 1102 after a reaction is selected by a user while a call is in progress. For example, a user may select reaction 1114, and copies of reaction 1114 may be displayed in a reaction field 1118 on one or both of the user's devices while the call is in progress. It will be understood that the particular arrangement of reaction field 1118 as well as the motion of elements thereof may vary within an embodiment and across embodiments. In this way, a user may send reactions while a call is in progress.

Figure 12:
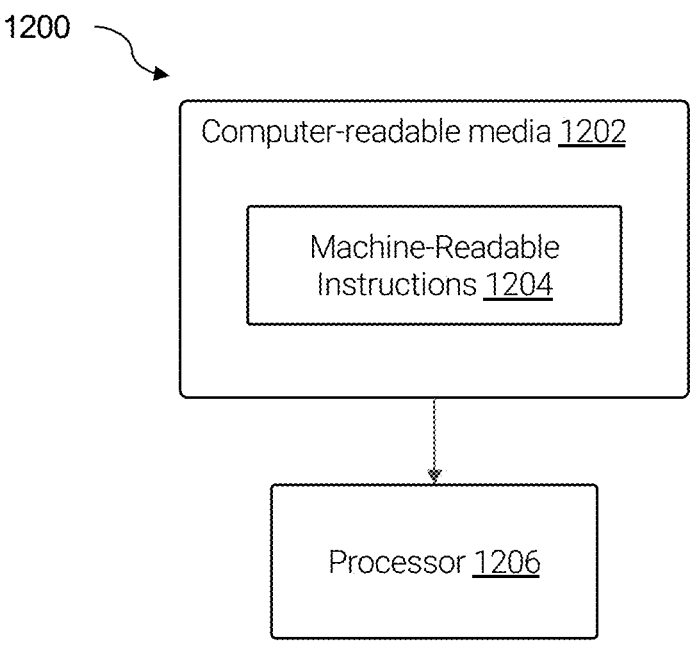
FIG. 12 illustrates an apparatus for interactive calling, according to one or more implementations herein.

FIG. 12 illustrates an apparatus 1200 for interactive calling, according to one or more implementations herein. The apparatus may include a tangible, non-transient, computer-readable media 1202, which may have instructions 1204 thereupon, which when implemented by a processor 1206, may cause processor 1206 to perform a method. The method may comprise receiving a call initiation request from a caller device. The method may further include determining a callee device. The method may further include instructing a call interface to initiate a call. The method may further include sending call metadata to the callee device. The method may further include receiving from the caller device or the callee device, a reaction. The method may further include logging the reaction. The method may further include sending the call summary. The method may be, for example, similar to methods 400, 500, or 600.

Advantages of embodiments herein may include an ability for users to richly interact and create call records of their calls with each other as well as be able to initiate calls with a select group of others. Furthermore, embodiments herein may provide improvements over existing calling systems, by permitting users to provide a call preview, thus giving a callee user additional information necessary to determine whether to accept or decline a call.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or sample claim limitation should not be interpreted to invoke 35 U.S.C. § 112(f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. A method, comprising:
   receiving, at a processor, a request from a caller device associated with a user and identified by a caller identifier, the request including the caller identifier, a callee identifier, and a call preview, wherein the call preview was input on the caller device;
   determining, using the processor, using a database stored on an electronic storage device in electronic communication with the processor, a callee device associated with the callee identifier;
   instructing, using the processor, a call interface to initiate a call, wherein the call interface is configured to connect the call to the caller device and the callee device; and
   sending, using the processor, call metadata to the callee device, the call metadata including the call preview.

2. The method of claim 1, further comprising connecting, using the processor, the caller device to the call.

3. The method of claim 1, further comprising:
   receiving, at the processor, from the callee device, a call acceptance; and
   connecting, using the processor, the callee device to the call.

4. The method of claim 1, wherein the call preview includes an audio recording.

5. The method of claim 1, wherein the call preview includes a video recording.

6. A system, comprising:
   a processor; and an electronic storage device in electronic communication with the processor, the electronic storage device having a database stored thereon;
   wherein the processor is configured to:
   receive a request from a caller device associated with a user and identified by a caller identifier, the request including the caller identifier, a callee identifier, and a call preview, wherein the call preview was input on the caller device;
   determine, using the database, a callee device associated with the callee identifier;
   instruct a call interface to initiate a call, wherein the call interface is configured to connect the call to the caller device and the callee device; and
   send call metadata to the callee device, the call metadata including the call preview.

7. The system of claim 6, wherein the processor is further configured to connect the caller device to the call.

8. The system of claim 6, wherein the processor is further configured to:
   receive, from the callee device, a call acceptance; and
   connect the callee device to the call.

9. The system of claim 6, wherein the call preview includes an audio recording.

10. The system of claim 6, wherein the call preview includes a video recording.

11. The system of claim 6, wherein the call metadata composes a push notification, and wherein the processor is configured to send the call metadata to the callee device by sending the push notification to the callee device.

12. The system of claim 6, wherein the call interface is configured to implement voice-over-internet protocol.

13. The system of claim 6, wherein the call interface is implemented using a cellular communications service to connect the caller device to the callee device.

14. The system of claim 6, wherein the call interface is implemented using the processor.

15. The system of claim 6, wherein:
   the request further includes an additional callee identifier;
   the processor is further configured to determine, using the database, an additional callee device associated with the additional callee identifier; and
   the call interface is further configured to connect the call to the additional callee device.

16. The system of claim 6, wherein the callee identifier is selected by the user of the caller device by dragging a profile image associated with the callee identifier to a callee identifier landing zone.

17. The system of claim 6, wherein the callee identifier is selected by the user of the caller device from a group of callee identifiers associated with the caller identifier.

18. The system of claim 17, wherein each callee identifier of the group of callee identifiers is associated with a user profile which has opted-in to receiving communications from the user.

19. The system of claim 6, wherein the processor is further configured to:
   receive from the caller device or the callee device, a reaction while the call is in progress;
   log the reaction in a call summary; and
   send the call summary to at least one of the caller device or the callee device.

20. A tangible, non-transitory, computer-readable media having instructions thereupon which when implemented by a processor cause the processor to perform a method comprising:

receiving a request from a caller device associated with a user and identified by a caller identifier, the request including the caller identifier, a callee identifier, and a call preview, wherein the call preview was input on the caller device;

determining a callee device associated with the callee identifier;

instructing call interface to initiate a call, wherein the call interface is configured to connect the call to the caller device and the callee device; and sending call metadata to the callee device, the call metadata including the call preview.

21. A method, comprising:

receiving a callee identifier from a caller device;

determining a callee device associated with the callee identifier; and transmitting a call preview received from the caller device to the callee device simultaneously with an attempt to initiate a call between the caller device and the callee device.

22. The method of claim 21, wherein the attempt to initiate the call is via a cellular network or a voice-over-internet protocol.

23. The method of claim 21, wherein the caller device receives the call preview before the attempt to initiate the call.

24. The method of claim 21, wherein the caller device receives the call preview concurrently with the attempt to initiate the call.

25. The method of claim 21, wherein the call preview comprises text, audio, or video.

26. The method of claim 21, wherein the call is an audio call or a video call.

\* \* \* \* \*